(12) United States Patent
Hattori et al.

(10) Patent No.: US 6,803,692 B2
(45) Date of Patent: Oct. 12, 2004

(54) PERMANENT MAGNET TYPE ELECTRIC MOTOR

(75) Inventors: Tomoyuki Hattori, Yokohama (JP); Kazuto Sakai, Yokosuka (JP); Masanori Arata, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/053,704

(22) Filed: Jan. 24, 2002

(65) Prior Publication Data

US 2002/0109429 A1 Aug. 15, 2002

Related U.S. Application Data

(63) Continuation of application No. PCT/JP01/04326, filed on May 23, 2001.

(30) Foreign Application Priority Data

May 24, 2000 (JP) ........................................ 2000-153387

(51) Int. Cl.[7] .............................................. H02K 21/12
(52) U.S. Cl. .................................. 310/156.53; 310/216
(58) Field of Search ....................... 310/156.15, 156.53, 310/156.56, 156.57, 156.07, 156.39, 216, 261, 156.45, 156.55

(56) References Cited

U.S. PATENT DOCUMENTS

| | | | |
|---|---|---|---|
| 4,924,130 A | | 5/1990 | Fratta |
| 5,378,953 A | * | 1/1995 | Uchida et al. ......... 310/156.59 |
| 5,642,013 A | * | 6/1997 | Wavre ...................... 310/254 |
| 6,008,559 A | | 12/1999 | Asano et al. |
| 6,087,751 A | * | 7/2000 | Sakai ..................... 310/156.45 |
| 6,268,677 B1 | * | 7/2001 | Takabatake et al. ... 310/156.45 |
| 6,274,960 B1 | * | 8/2001 | Sakai et al. ............ 310/156.02 |
| 6,329,734 B1 | | 12/2001 | Takahashi et al. |
| 6,342,745 B1 | | 1/2002 | Sakai et al. |

FOREIGN PATENT DOCUMENTS

| | | | |
|---|---|---|---|
| EP | 0 598 137 | 5/1994 | .......... H02K/21/14 |
| EP | 0 889 574 | 1/1999 | |
| EP | 0 889 574 A1 | 1/1999 | .......... H02K/19/10 |
| EP | 0 991 166 | 4/2000 | .......... H02K/19/10 |
| EP | 1 014 541 | 6/2000 | |
| JP | 11-18328 | 1/1999 | |
| JP | 11-018328 | 1/1999 | ............ H02K/1/14 |
| JP | 2000-125493 | 4/2000 | ............ H02K/1/27 |
| WO | WO 99/17420 | 4/1999 | |

OTHER PUBLICATIONS

T.J.E. Miller, et al., IEEE Transactions on Industry Applications. vol. 27, No. 4, pp. 741–749, "Design of a Synchronous Reluctance Motor Drive", Jul./Aug. 1991.

Longya Xu, et al., IEEE Industry Applications Society Annual Meeting Conference Record, pp. 3–8, "A New Design Concept of Permanent Magnet Machine for Flux Weakening Operation", 1993.

D. A. Staton, et al., IEEE Conference Electrical Machines and Drives, London, pp. 156–160, "Optimisation of the Synchronous Reluctance Motor Geometry", Sep. 1991.

* cited by examiner

*Primary Examiner*—Dang Le
*Assistant Examiner*—Nguyen Hanh
(74) *Attorney, Agent, or Firm*—Oblon, Spivak, McClelland, Maier & Neustadt, P.C.

(57) ABSTRACT

The permanent magnet type reluctance electric motor includes a stator including a stator iron core and having armature coils placed inside slots, and a rotor provided with a plurality of magnetic barriers formed by cavities and placed on an inner side of the stator such that sections where a magnetic flux can easily pass (d-axis) and sections where a magnetic flux cannot easily pass (q-axis) are alternately formed, and made of a rotor iron core having permanent magnets in cavities. The rotor satisfies a relationship of $PL/2\pi RW_{qave} \geq 130$, where $W_{qave}$ [m] indicates an average thickness of the rotor iron core on an outer side in a radial direction of the rotor with respect to cavities arranged in a q-axis direction, L [m]; a width in a circumferential direction of the cavities, P; the number of poles and R [m]; the radius of the rotor.

11 Claims, 6 Drawing Sheets

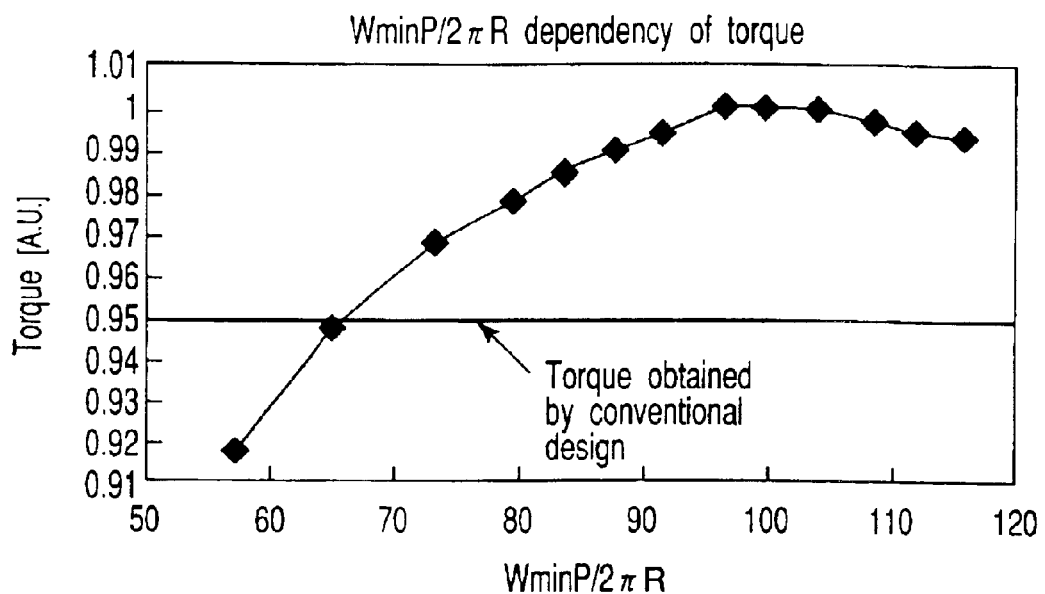
F I G. 8
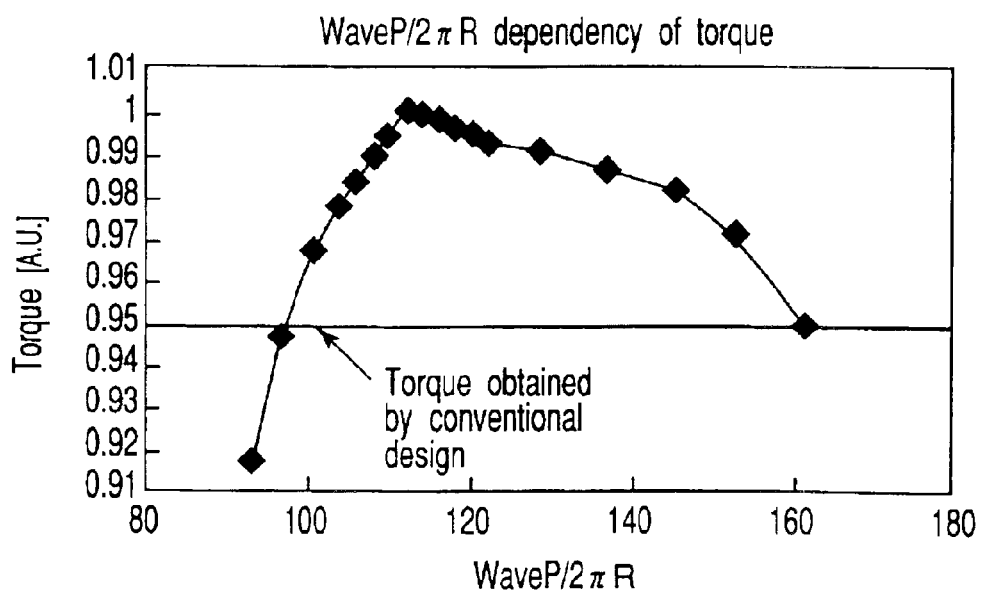
F I G. 9

PERMANENT MAGNET TYPE ELECTRIC MOTOR

CROSS REFERENCE TO RELATED APPLICATIONS

This is a Continuation Application of PCT Application No. PCT/JP01/04326, filed May 23, 2001, which was not published under PCT Article 21(2) in English.

This application is based upon and claims the benefit of priority from the prior Japanese Patent Application No. 2000-153387, filed May 24, 2000, the entire contents of which are incorporated herein by reference.

BACKGROUND OF THE INVENTION

1. Field of the Invention

The present invention relates to a permanent magnet type reluctance electric motor which is small-sized, and capable of a high output and a varying speed operation in a wide range from a low-speed to a high-speedrotation, achieved by composite permanent magnet.

2. Description of the Related Art

FIG. 1 is a cross sectional diagram directed in a diametrical direction, showing an example of the structure of a conventional reluctance motor.

As shown in FIG. 1, the reluctance-type electric motor includes a stator 1 made of a stator iron core 2 made by laminating electronic steel plates, and having armature coils 3 placed inside slots 7, and a rotor 10 placed on an inner side of the stator 1 and made of a rotor iron core 4 having projections and recesses.

The conventional reluctance electric motor having such a structure as described above does not require a coil for creating a field magnet in the rotor 10, and thus the rotor 10 can be made of only the rotor iron core 4 having projections and recesses.

Therefore, the reluctance electric motor has a simple structure and is of a low cost.

Next, the principle of generating an output from the above-type of reluctance electric motor will now be described.

In the reluctance electric motor, the rotor 10 has projections and recesses. With this structure, the magnetic reluctance is small at a projecting portion, whereas the magnetic reluctance is large at a recess portion.

In other words, the magnetic energy which is stored by allowing an electrical current to the motor coil 3 differs between gap sections on the projecting and recess portions. Due to the difference in the magnetic energy, an output is generated.

It should be noted here that the shapes of the projecting portions and recess portions may be arbitrary as long as they can generate projections and recesses not in terms of geometrically but magnetically (that is, the magnetic reluctance as well as the magnetic flux density distribution differ from one position to another in the rotor 10).

In the meantime, there is another type of a high-performance motor as a permanent magnet electric motor. The permanent magnet electric motor has an armature similar to that of the reluctance electric motor, but the rotor is provided with permanent magnets arranged around substantially the entire circumference of the rotor iron core and the rotor itself.

Incidentally, such a conventional electric motor as described above entails technical drawbacks to be solved.

That is, the reluctance electric motor has projections and recesses on the surface of the rotor iron core 4, and therefore the magnetic reluctance differs depending on the rotating position, and the magnetic flux density changes as well. Then, due to the changes, the magnetic energy changes as well to generate an output.

However, as an electric current increases, the regional magnetic saturation in a projecting portion of the rotor iron core 4, which serves as a magnetic pole, is enlarged (the projecting section being a section where the magnetic flux easily passes through, and to be called d-axis hereinafter).

As a result of this, the magnetic flux which leaks to the recess portion of teeth, which is an in-between of magnetic poles, is increased, (the recess section being a section where the magnetic flux does not easily pass through, and to be called q-axis hereinafter) and therefore a significant magnetic flux is decreased, thereby lowering the output.

Or in terms of the magnetic energy, due to the leaking magnetic flux created by the magnetic saturation of the iron core teeth, the change in the gap magnetic flux density becomes smooth, and the change in the magnetic energy becomes small.

Therefore, the increasing rate of the output with respect to the current is decreased, and the output is eventually saturated. Further, the leaking flux of the g-axis induces a reactive voltage, and therefore the power factor is decreased.

Further, there is another type of a high-performance motor, which is a permanent magnet electric motor in which rare earth permanent magnets of a high magnetic energy product are applied.

The permanent magnet electric motor has permanent magnets on the surface of the rotor iron core. With this structure, the permanent magnets of a high energy are applied to the field magnet, and thus a high magnetic field can be formed in a cavity of the electric motor, thereby making it possible to realize a small-sized but high-output type.

However, since the flux of the permanent magnets is constant, the voltage induced to the motor coil at a high-speed rotation, becomes larger in a proportional manner.

Therefore, in the case of performing a variable speed drive in a wide range from a low speed to a high-speed rotation, the field magnet flux cannot be decreased. Therefore, when the power voltage is set constant, it is difficult to perform a constant output drive at a speed twice as high or more of the base speed.

BRIEF SUMMARY OF THE INVENTION

An object of the present invention is to provide a small-sized and high-output permanent magnet type reluctance electric motor capable of a variable speed operation in a wide range from a low-speed to high-speed rotation.

In order to achieve the above-described object, there is provided, according to the present invention, a permanent magnet type reluctance electric motor comprising: a stator including a stator iron core and having armature coils placed inside slots, and a rotor provided with a plurality of magnetic barriers formed by cavities and placed on an inner side of the stator in such a manner that sections where a magnetic flux can easily pass (d-axis) and sections where a magnetic flux cannot easily pass (q-axis) are alternately formed, and made of a rotor iron core having permanent magnets in cavities, wherein the rotor satisfies a relationship of $PL/2\pi RW_{qave} \geq 130$, where $W_{qave}$ [m] indicates an average thickness of the rotor iron core on an outer side in a radial direction of the rotor with respect to cavities arranged in a q-axis direction, L [m] indicates a width in a circumferential direction of the cavities, P indicates the number of poles and R [m] indicates the radius of the rotor.

Therefore, in the permanent magnet type reluctance electric motor of the present invention, the rotor satisfies a relationship of $PL/2\pi RW_{qave} \geq 130$. With this structure, a high torque can be obtained, and therefore it is possible to perform a variable speed drive at a high output in a wide range from a low speed to a high-speedrotation.

Further, in the permanent magnet type reluctance electric motor recited in claim 1 of the present invention, the rotor is formed to have a structure which satisfies a relationship of: $PL/2\pi RW_{qave} \geq 200$.

As described above, in the permanent magnet type reluctance electric motor of the present invention, the rotor satisfies a relationship of: $PL/2\pi RW_{qave} \geq 200$. With this structure, an even higher torque can be obtained, and therefore it is possible to perform a variable speed drive at a higher output in a wide range from a low speed to a high-speedrotation.

Further, in the permanent magnet type reluctance electric motor recited in claim 1 or 2 of the present invention, the cavities arranged in the q-axis direction are made to go through to an outer circumferential portion in a radial direction of the rotor.

Thus, in the permanent magnet type reluctance electric motor of the present invention, the cavities arranged in the q-axis direction are made to go through to an outer circumferential portion in the radial direction of the rotor. With this structure, at a low-speed rotation, an especially high torque can be obtained, and therefore it is possible to perform a variable speed drive at a higher output and in a wide range from a low speed to a high-speed rotation.

Further, there is provided, according to the present invention, a permanent magnet type reluctance electric motor comprising: a stator including a stator iron core and having armature coils placed inside slots, and a rotor provided with a plurality of magnetic barriers formed by cavities and placed on an inner side of the stator in such a manner that sections where a magnetic flux can easily pass (d-axis) and sections where a magnetic flux cannot easily pass (q-axis) are alternately formed, and made of a rotor iron core having permanent magnets in cavities, wherein the rotor satisfies a relationship of $W_{dmin}P/2\pi R \geq 65$, where $W_{dmin}$ [m] indicates a minimum distance between a cavity arranged in the q-axis direction and a permanent magnet, P indicates the number of poles and R [m] indicates the radius of the rotor.

Therefore, in the permanent magnet type reluctance electric motor of the present invention, the rotor satisfies a relationship of $W_{dmin}P/2\pi R \geq 65$. With this structure, a high torque can be obtained, and therefore it is possible to perform a variable speed drive at a high output in a wide range from a low-speed to a high-speed rotation.

Further, in the permanent magnet type reluctance electric motor recited in claim 4 of the present invention, the rotor is formed to have a structure which satisfies a relationship of: $W_{dmin}P/2\pi R \geq 87$.

As described above, in the permanent magnet type reluctance electric motor of the present invention, the rotor satisfies a relationship of: $W_{dmin}P/2\pi R \geq 87$. With this structure, an even higher torque can be obtained, and therefore it is possible to perform a variable speed drive at a higher output in a wide range from a low-speed to a high-speed rotation.

Further, there is provided, according to the present invention, a permanent magnet type reluctance electric motor comprising: a stator including a stator iron core and having armature coils placed inside slots, and a rotor provided with a plurality of magnetic barriers formed by cavities and placed on an inner side of the stator in such a manner that sections where a magnetic flux can easily pass (d-axis) and sections where a magnetic flux cannot easily pass (q-axis) are alternately formed, and made of a rotor iron core having permanent magnets in cavities, wherein the rotor satisfies a relationship of $95 \leq W_{dave}P/2\pi R \leq 160$, where $W_{dave}$ [m] indicates an average distance between a cavity arranged in the q-axis direction and a permanent magnet, P indicates the number of poles and R [m] indicates the radius of the rotor.

Therefore, in the permanent magnet type reluctance electric motor of the present invention, the rotor satisfies a relationship of $95 \leq W_{dave}P/2\pi R \leq 160$. With this structure, a high torque can be obtained, and therefore it is possible to perform a variable speed drive at a high output in a wide range from a low-speed to a high-speed rotation.

Further, in the permanent magnet type reluctance electric motor recited in claim 6 of the present invention, the rotor is formed to have a structure which satisfies a relationship of: $110 \leq W_{dave}P/2\pi R \leq 130$.

As described above, in the permanent magnet type reluctance electric motor of the present invention, the rotor satisfies a relationship of: $110 \leq W_{dave}P/2\pi R \leq 130$. With this structure, an even higher torque can be obtained, and therefore it is possible to perform a variable speed drive at a higher output in a wide range from a low-speed to a high-speed rotation.

Further, according to the present invention, the width in the radial direction of a cavity situated in the q-axis direction is increased towards the center in the q-axis direction.

As described above, in the permanent magnet type reluctance electric motor of the present invention, the width in the radial direction of a cavity situated in the q-axis direction is increased towards the center in the q-axis direction. With this structure, an even higher torque can be obtained, and therefore it is possible to perform a variable speed drive at a higher output in a wide range from a low-speed to a high-speed rotation.

Further, according to the present invention, the angle of the permanent magnets is changed so that the distance between a cavity situated in the q-axis direction and a permanent magnet becomes maximum at a position on an inner diameter side of the center of the cavity in the q-axis direction.

As described above, in the permanent magnet type reluctance electric motor of the present invention, the angle of the permanent magnets is changed so that the distance between a cavity situated in the q-axis direction and a permanent magnet becomes maximum at a position on an inner diameter side of the center of the cavity in the q-axis direction. With this structure, an even higher torque can be obtained, and therefore it is possible to perform a variable speed drive at a higher output in a wide range from a low-speed to a high-speed rotation.

Further, there is provided, according to the present invention, a permanent magnet type reluctance electric motor comprising: a stator including a stator iron core and having armature coils placed inside slots, and a rotor provided with a plurality of magnetic barriers formed by cavities and placed on an inner side of the stator in such a manner that sections where a magnetic flux can easily pass (d-axis) and sections where a magnetic flux cannot easily pass (q-axis) are alternately formed, and made of a rotor iron core having permanent magnets in cavities, wherein the rotor satisfies a relationship of $0.45 \leq W_t/\tau \leq 0.8$, where $\tau$ [m] indicates the pitch of the slot and $W_t$ [m] indicates the width of the teeth.

Therefore, in the permanent magnet type reluctance electric motor of the present invention, the rotor satisfies a relationship of $0.45 \leq W_t/\tau \leq 0.8$. With this structure, a high torque can be obtained, and therefore it is possible to perform a variable speed drive at a high output in a wide range from a low-speed to a high-speed rotation.

Further, in the permanent magnet type reluctance electric motor, the rotor is formed to have a structure which satisfies a relationship of: $0.45 \leq W_t/\tau \leq 0.8$.

As described above, in the permanent magnet type reluctance electric motor of the present invention, the rotor satisfies a relationship of: $0.45 \leq W_t/\tau \leq 0.8$. With this structure, an even higher torque can be obtained, and therefore it is possible to perform a variable speed drive at a higher output in a wide range from a low-speed to a high-speed rotation.

BRIEF DESCRIPTION OF THE SEVERAL VIEWS OF THE DRAWING

FIG. 8 is a characteristic diagram illustrating the $W_{dmin}P/2\pi R$ dependency of the torque in the permanent magnet type reluctance electric motor according to the second embodiment of the present invention;

FIG. 9 is a characteristic diagram illustrating the $W_{dave} P/2\pi R$ dependency of the torque in the permanent magnet type reluctance electric motor according to the third embodiment of the present invention;

DETAILED DESCRIPTION OF THE INVENTION

Embodiments of the present invention will now be described in detail with reference to accompanying drawings.

(First Embodiment)

Figure 1:
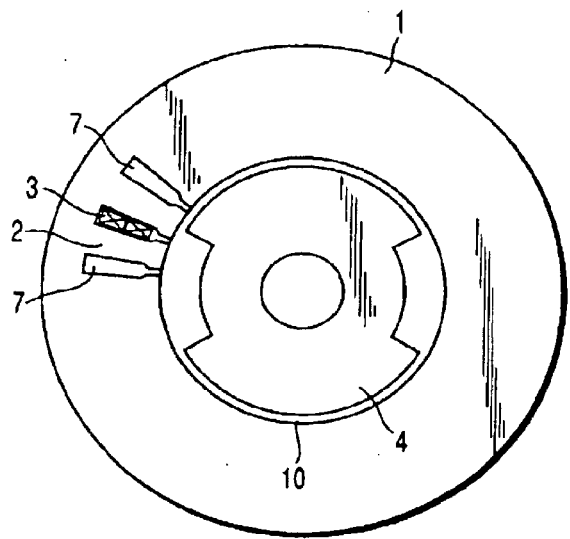
FIG. 1 is a cross sectional diagram showing an example of the structure of a conventional reluctance electric motor.
Figure 2:
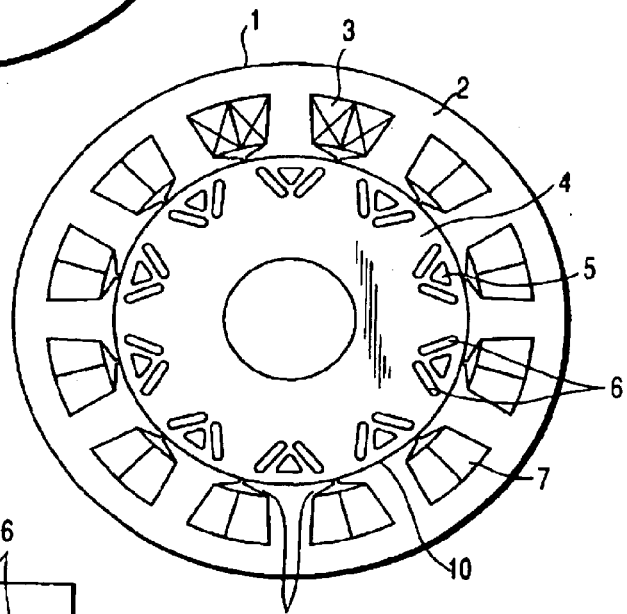
FIG. 2 is a cross sectional diagram showing an example of the structure of the permanent magnet type reluctance electric motor according to the first to third embodiments of the present invention.

FIG. 2 is a cross sectional diagram showing an example of the structure of the permanent magnet type reluctance electric motor according to an embodiment of the present invention, and similar structural elements to those shown in FIG. 1 are designated by the same reference numerals.

As shown in FIG. 2, the permanent magnet type reluctance electric motor according to this embodiment, comprises: a stator 1 including a stator iron core 2 made by laminating electromagnetic steel plates and having armature coils 3 placed inside slots 7, and a rotor 10 provided with a plurality of magnetic barriers formed by cavities 5 and placed on an inner side of the stator 1 in such a manner that a d-axis and a q-axis are alternately formed, and made of a rotor iron core 4 having permanent magnets 6 in cavities 5.

It should be noted that numeral 8 indicates an iron core tooth.

Figure 3A:
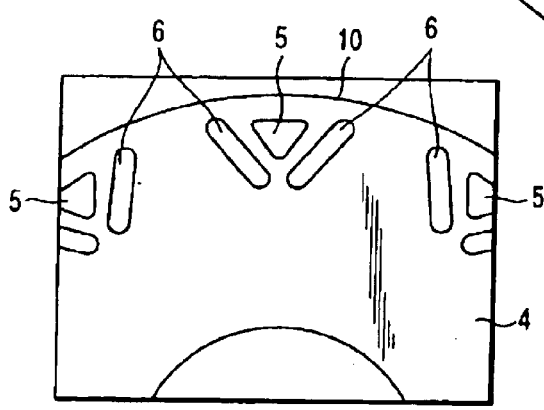
FIGS. 3A and 3B are cross sectional views showing an example of the structure in detail of a rotor shown in FIG. 2.

FIG. 3 is an enlarged cross sectional view showing an example of the structure of a part of a rotor 10 in detail shown in FIG. 2.

As shown in FIG. 3, there are a plurality of cavities 5 present in the rotor iron core 4 of the rotor 10, and a permanent magnet 6 is inserted to a section arranged in V-shape of these cavities.

Figure 4:
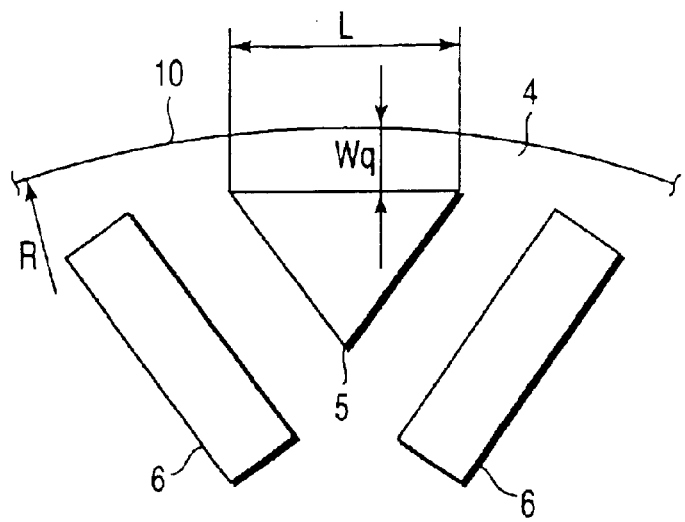
FIG. 4 is an enlarged cross sectional view showing an example of the structure in detail of a rotor shown in FIG. 2.

FIG. 4 is an enlarged cross sectional view showing an example of the structure of a part of the rotor 10 in detail shown in FIG. 2.

As shown in FIG. 4, the rotor 10 is formed to satisfy a relationship of $PL/2\pi RW_{qave} \geq 130$, where $W_{qave}$ [m] indicates an average thickness of the rotor iron core 4 on an outer side in a radial direction of the rotor with respect to cavities 5 arranged in the q-axis direction, L [m] indicates the width in a circumferential direction of the cavities 5, P indicates the number of poles and R [m] indicates the radius of the rotor 10.

It should be noted here that the rotor 10 should preferably be made so as to satisfy a relationship of: $PL/2\pi RW_{qave} \geq 200$.

In the permanent type reluctance electric motor according to this embodiment, having the above-described structure, the rotor 10 is formed to satisfy a relationship of $PL/2\pi RW_{qave} \geq 130$. With this structure, a high torque can be obtained.

This point will now be described in detail.

There are irregularities (projections and recesses) in terms of magnetic reluctance due to cavities 5. In a section where the magnetic reluctance is low (d-axis), the magnetic flux density of the cavity is high, whereas in a section where the magnetic reluctance is high (q-axis), the magnetic flux density of the cavity is low. Due to the change in the magnetic flux density, the reluctance torque is generated.

In the case where the number of poles is P, the magnetic reluctance in a thickness of the rotor iron core 4 on an outer side in a radial direction of the cavities 5 arranged in the q-axis direction is proportional to $PL/2\pi RW_{qave}$, where R indicates the radius [m] of the rotor 10, $W_{qave}$ [m] indicates the average thickness of the rotor iron core 4 on an outer side in a radial direction of the rotor with respect to cavities 5 arranged in a q-axis direction, and L [m] indicates the width in a circumferential direction of the cavities 5.

Figure 5:
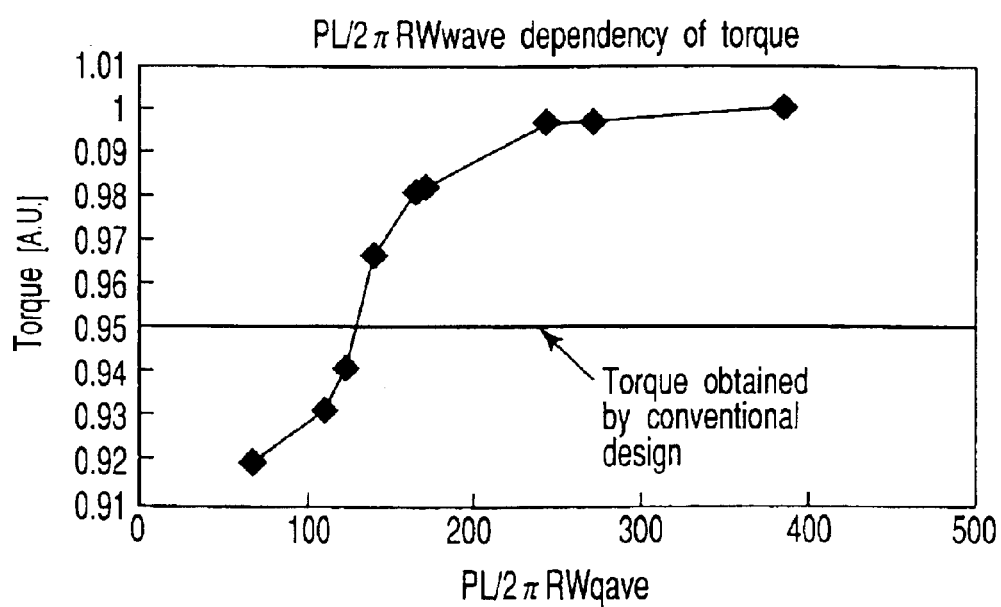
FIG. 5 is a dependency characteristic diagram illustrating a correlation between the torque and $PL/2\pi RW_{qave}$ in the permanent magnet type reluctance electric motor according to the first embodiment of the present invention.

FIG. 5 is a dependency characteristic diagram illustrating a correlation between the torque and $PL/2\pi RW_{qave}$ when an analysis is carried out on a model designed by conditions that the number of poles is 8 and the radius of the rotor 10 is 0.08 [m].

As is clear from FIG. 5, it is understood that when $PL/2\pi RW_{qave} \geq 130$, a torque having 95% or more of the maximum torque value obtained this time, which is higher than that obtained by conventional designing, can be obtained.

Further, as a more preferable example, when $PL/2\pi RW_{qave} \geq 200$, a torque having 99% or more of the maximum torque value can be obtained.

As described above, a high torque can be obtained and as a result, it becomes possible to perform a variable speed drive at a high output (output=torque×rotation speed) in a wide range from a low-speed to a high-speed rotation.

VARIATION EXAMPLE 1

In the above-described embodiment, the cavities 5 arranged in the q-axis direction are made through to the outer peripheral section in the radial direction of the rotor.

In the permanent magnet type reluctance electric motor having the above-described structure, the cavities 5 arranged in the q-axis direction are made through to the outer peripheral section in the radial direction of the rotor. With this structure, a high torque can be obtained especially at a low-speed drive.

The above-described point will now be described in detail.

With a design having a large value in $PL/2\pi RW_{qave}$, it is considered that there are a great number of poles, the radius is small, $W_{qave}$ [m] indicates the average thickness of the rotor iron core 4 on an outer side in a radial direction of the rotor with respect to cavities 5 arranged in a q-axis direction is small, and the width in a circumferential direction of the cavities 5 is wide.

However, in practice, the number of poles and the radius of the rotor 10 are determined substantially by the designed specification. Therefore, actually operable ones are $W_{qave}$ and L.

Figure 6:
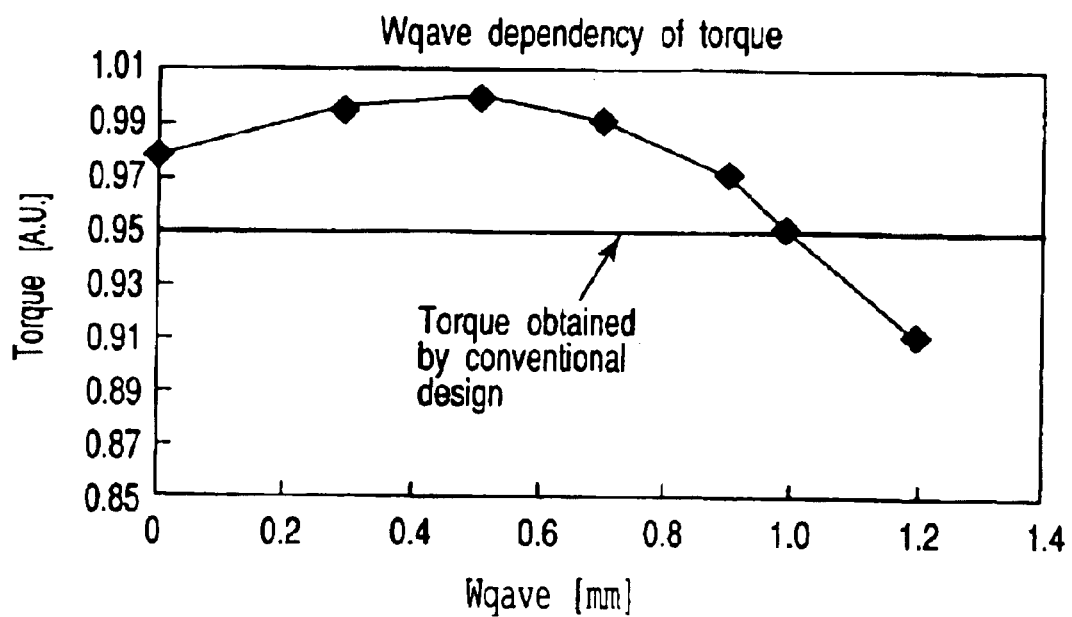
FIG. 6 is a characteristic diagram illustrating the $W_{qave}$ dependency of the torque in the permanent magnet type reluctance electric motor according to the first embodiment of the present invention.

FIG. 6 is a diagram illustrating the result of the examination on the $W_{qave}$ dependency of the torque.

From FIG. 6, it is understood that when $W_{qave} \leq 1$ mm, a higher torque than that obtained by conventional designing can be obtained. This is because in the rotary iron core 4 in the outer circumference in the radial direction of the cavities 5 arranged in the q-axis direction, when $W_{qave}$ is set to a thickness in the above numerical range, the q-axis flux with respect to the d-axis flux distributed in this section can be minimized.

At this point, the difference between the flux density in the d-axis direction and the flux density in the q-axis direction becomes large, and the reluctance torque is increased. When $W_{qave}=0$, the reluctance torque is particularly increased prominently.

With the structure described above, it is possible to perform a variable speed drive even at a higher output in a wide range from a low speed to a high-speed rotation.

On the other hand, in a high-speed rotation zone, When $W_{qave}=0$, the problem of windage loss may occur. In order to avoid this, when used in, for example, a high-speed motor, it is preferable that the cavities 5 arranged in the q-axis direction should preferably be of such a structure that the outer circumferential portion in the radial direction of the rotor iron core 4 is formed thin ($0<W_{qave} \leq 1$ mm), rather than a structure in which the cavities 5 are made through to the outer circumference in the radial direction of the rotor ($W_{qave}=0$).

VARIATION EXAMPLE 2

Figure 3B:
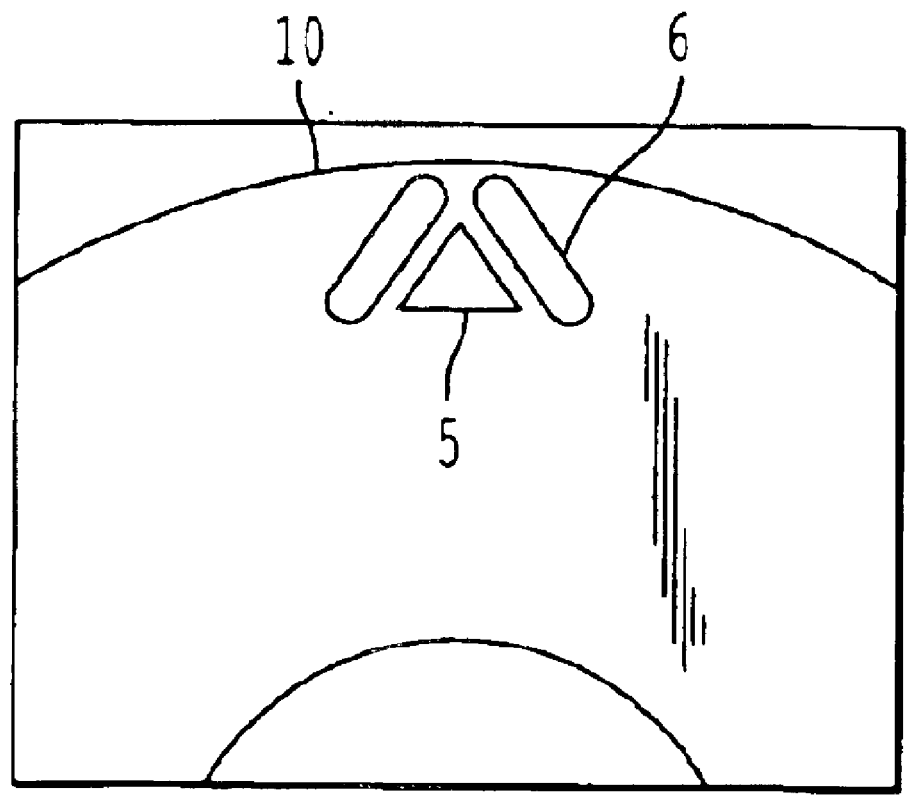

In the above-described embodiment (the structure shown in FIG. 3A), it is also possible that the width of the cavities 5 arranged in the q-axis direction are made to increase towards the center of the q-axis direction (see FIG. 3B).

In the permanent magnet type reluctance electric motor having the above-described structure, the width of the cavities 5 arranged in the q-axis direction are made to increase towards the center of the q-axis direction. With this structure, the magnet reluctance becomes maximum in the q-axis direction.

At this point, the difference between the flux density in the d-axis direction and the flux density in the q-axis direction becomes large, and the reluctance torque becomes maximum.

With the structure described above, it is possible to perform a variable speed drive even at a higher output in a wide range from a low speed to a high-speed rotation.

VARIATION EXAMPLE 3

In the above-described embodiment (the structure shown in FIG. 4), it is also possible that the angle of the permanent magnets 6 is changed so that the distance between a cavity 5 situated in the q-axis direction and a permanent magnet 6 becomes maximum at a position on an inner diameter side of the center of the cavity in the q-axis direction.

As described above, in the permanent magnet type reluctance electric motor of the present invention, the angle of the permanent magnets 6 is changed so that the distance between a cavity 5 situated in the q-axis direction and a permanent magnet 6 becomes maximum at a position on an inner diameter side of the center of the cavity 5 in the q-axis direction. With this structure, the magnetic flux of the magnet can more easily go out to the outer circumference of the rotor, and therefore even a higher torque can be obtained.

Thus, it is possible to perform a variable speed drive even at a higher output in a wide range from a low-speed to a high-speed rotation.

As described above, in the permanent magnet type reluctance type electric motor according to this embodiment, the rotor 10 is formed to satisfy a relationship of $PL/2\pi RW_{qave} \geq 130$, or more preferably, $PL/2\pi RW_{qave} \geq 200$, where $W_{qave}$ [m] indicates an average thickness of the rotor iron core 4 on an outer side in a radial direction of the rotor with respect to cavities 5 arranged in the q-axis direction, L [m] indicates the width in a circumferential direction of the cavities 5, P indicates the number of poles and R [m] indicates the radius of the rotor 10. With this structure, it becomes possible with a small size to perform a variable speed drive even at a higher output in a wide range from a low speed to a high-speed rotation.

(Second Embodiment)

Figure 7:
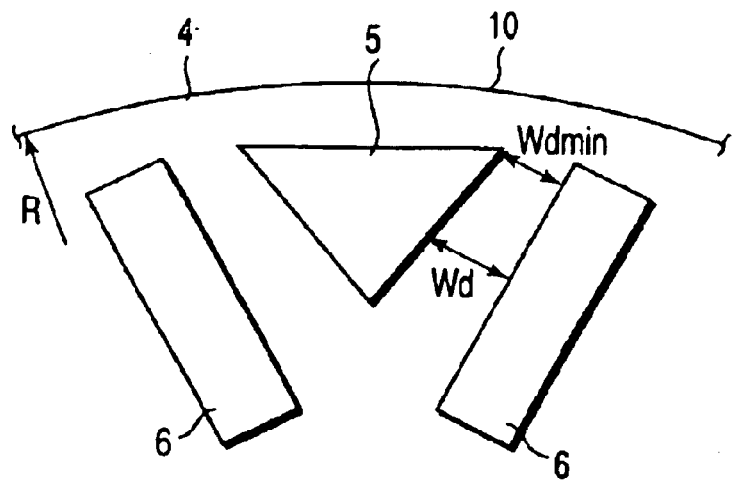
FIG. 7 is an enlarged cross sectional diagram showing an example of the structure of the permanent magnet type reluctance electric motor according to the second and third embodiments of the present invention.

FIG. 7 is a cross sectional diagram showing an enlarged view of a part of a rotor 10 in the permanent magnet type reluctance electric motor according to the embodiment of the present invention, and in this figure, similar structural elements to those shown in FIGS. 2 to 4 are designated by the same reference numerals, the description of which will not be repeated here. Thus, only different sections from those already described will now be explained.

As shown in FIG. 7, the rotor 10 of the permanent magnet type reluctance electric motor according to this embodiment, is formed to satisfy a relationship of:

$W_{dmin}P/2\pi R \geq 65$, where $W_{dmin}$ [m] indicates a minimum distance between a cavity 5 arranged in the q-axis direction, L [m]

indicates the width in a circumferential direction of the cavities 5 and a permanent magnet 6, P indicates the number of poles and R [m] indicates the radius of the rotor 10.

It should be noted here that the rotor 10 should preferably be made so as to satisfy a relationship of: $W_{dmin}P/2\pi R \geq 87$.

With this structure, the permanent magnet type reluctance electric motor according to this embodiment, has the rotor 10 which is formed to satisfy a relationship of: $W_{dmin}P/2\pi R \geq 65$, and therefore even a higher torque can be obtained.

This point will now be described in detail.

FIG. 8 is a dependency characteristic diagram illustrating the result of a test for the relationship between $PW_{dmin}/2\pi R$ and the torque, where $W_d$ indicates the distance between a cavity 5 arranged in the q-axis direction, $W_{dmin}$ indicates the minimum distance, P indicates the number of poles and R [m] indicates the radius of the rotor 10, as shown in FIG. 7.

From FIG. 8, it is understood that when a relationship of $PW_{dmin}/2\pi R \geq 65$ is satisfied, 95% or higher of the maximum torque obtained this time, which is higher than that obtained with conventional designing, can be obtained.

Further, more preferably, when a relationship of $PW_{dmin}/2\pi R \geq 87$ is satisfied, 99% or higher of the maximum torque obtained this time can be obtained.

Here, according to the design specification, the number of poles and the radius of the rotor 10 are approximately determined. Therefore, it may be considered that $PW_{dmin}/2\pi R$ is proportional to $W_{dmin}$.

That is, when $W_{dmin}$ is large, the magnetic saturation which occurs at a site of the rotor iron core 4 between the cavity 5 arranged in the q-axis direction and permanent magnet 6 becomes less, which means that the flux in the d-axis direction is increased and the reluctance torque is raised.

As described above, a high torque can be obtained and as a result, it becomes possible to perform a variable speed drive at a high output (output=torque×rotation speed) in a wide range from a low-speed to a high-speed rotation.

VARIATION EXAMPLE 1

In the above-described embodiment (the structure shown in FIG. 7), it is also possible that the width of the cavities 5 arranged in the q-axis direction are made to increase towards the center of the q-axis direction.

In the permanent magnet type reluctance electric motor having the above-described structure, the width of the cavities 5 arranged in the q-axis direction are made to increase towards the center of the q-axis direction. With this structure, the magnet reluctance becomes maximum in the q-axis direction.

At this point, the difference between the flux density in the d-axis direction and the flux density in the q-axis direction becomes large, and the reluctance torque becomes maximum.

With the structure described above, it is possible to obtain an even higher torque, and perform a variable speed drive even at a higher output in a wide range from a low speed to a high-speed rotation.

VARIATION EXAMPLE 2

In the above-described embodiment (the structure shown in FIG. 7), it is also possible that the angle of the permanent magnets 6 is changed so that the distance between a cavity 5 situated in the q-axis direction and a permanent magnet 6 becomes maximum at a position on an inner diameter side of the center of the cavity in the q-axis direction.

In the permanent magnet type reluctance electric motor of the present invention, the angle of the permanent magnets 6 is changed so that the distance between a cavity 5 situated in the q-axis direction and a permanent magnet 6 becomes maximum at a position on an inner diameter side of the center of the cavity 5 in the q-axis direction. With this structure, the magnetic flux of the magnet can more easily go out to the outer circumference of the rotor, and therefore even a higher torque can be obtained.

Thus, it is possible to perform a variable speed drive even at a higher output in a wide range from a low-speed to a high-speed rotation.

As described above, in the permanent magnet type reluctance type electric motor according to this embodiment, the rotor 10 is formed to satisfy a relationship of $W_{dmin}P/2\pi R \geq 65$, or more preferably, $W_{dmin}P/2\pi R \geq 87$, where $W_{dmin}$ indicates the minimum distance, P indicates the number of poles and R [m] indicates the radius of the rotor 10. With this structure, it becomes possible with a small size to perform a variable speed drive even at a higher output in a wide range from a low speed to a high-speedrotation.

(Third Embodiment)

FIG. 7 is a cross sectional diagram showing an enlarged view of a part of a rotor 10 in the permanent magnet type reluctance electric motor according to the embodiment of the present invention, and in this figure, similar structural elements to those shown in FIGS. 2 to 4 are designated by the same reference numerals, the description of which will not be repeated here. Thus, only different sections from those already described will now be explained.

As shown in FIG. 7, the rotor 10 of the permanent magnet type reluctance electric motor according to this embodiment, is formed to satisfy a relationship of:

$95 \leq W_{dave}P/2\pi R \leq 160$, where $W_{dave}$ [m] indicates an average distance between a cavity arranged in the q-axis direction and a permanent magnet, P indicates the number of poles and R [m] indicates the radius of the rotor.

It should be noted here that the rotor 10 should preferably be made so as to satisfy a relationship of: $110 \leq W_{dave}P/2\pi R \leq 130$.

With this structure, the permanent magnet type reluctance electric motor according to this embodiment, has the rotor 10 which is formed to satisfy a relationship of: $95 \leq W_{dave}P/2\pi R \leq 160$, and therefore even a higher torque can be obtained.

This point will now be described in detail.

FIG. 9 is a dependency characteristic diagram illustrating the result of a test for the relationship between $PW_{dave}/2\pi R$ and the torque, where $W_d$ indicates the average distance between a cavity 5 arranged in the q-axis direction, P indicates the number of poles and R [m] indicates the radius of the rotor 10, as shown in FIG. 7.

From FIG. 9, it is understood that when a relationship of $95 \leq W_{dave}P/2\pi R \leq 160$, is satisfied, 95% or higher of the maximum torque obtained this time, which is higher than that obtained with conventional designing, can be obtained.

Further, more preferably, when a relationship of $110 \leq W_{dave}P/2\pi R \leq 130$, is satisfied, 99% or higher of the maximum torque obtained this time can be obtained.

Here, according to the design specification, the number of poles and the radius of the rotor 10 are approximately determined. Therefore, it may be considered that $PW_{dave}/2\pi R$ is proportional to $W_{dave}$.

That is, when $W_{dave}$ is large, the magnetic saturation which occurs at a site of the rotor iron core 4 between the cavity 5 arranged in the q-axis direction and permanent magnet 6 becomes less, which means that the reluctance torque is raised. On the other hand, if $W_{dave}$ becomes extremely large, the reluctance torque is lowered in reverse to expectation.

As described above, a high torque can be obtained and as a result, it becomes possible to perform a variable speed drive at a high output (output=torque×rotation speed) in a wide range from a low-speed to a high-speed rotation.

VARIATION EXAMPLE 1

In the above-described embodiment (the structure shown in FIG. 7), it is also possible that the width of the cavities 5 arranged in the q-axis direction are made to increase towards the center of the q-axis direction.

In the permanent magnet type reluctance electric motor having the above-described structure, the width of the cavities 5 arranged in the q-axis direction are made to increase towards the center of the q-axis direction. With this structure, and therefore the magnet reluctance becomes maximum in the q-axis direction.

At this point, the difference between the flux density in the d-axis direction and the flux density in the q-axis direction becomes large, and the reluctance torque becomes maximum.

With the structure described above, it is possible to obtain an even higher torque, and perform a variable speed drive even at a higher output in a wide range from a low speed to a high-speed rotation.

VARIATION EXAMPLE 2

In the above-described embodiment (the structure shown in FIG. 7), it is also possible that the angle of the permanent magnets 6 is changed so that the distance between a cavity 5 situated in the q-axis direction and a permanent magnet 6 becomes maximum at a position on an inner diameter side of the center of the cavity in the q-axis direction.

In the permanent magnet type reluctance electric motor of the present invention, the angle of the permanent magnets 6 is changed so that the distance between a cavity 5 situated in the q-axis direction and a permanent magnet 6 becomes maximum at a position on an inner diameter side of the center of the cavity 5 in the q-axis direction. With this structure, the magnetic flux of the magnet can more easily go out to the outer circumference of the rotor, and therefore even a higher torque can be obtained.

Thus, since a higher torque can be obtained, it is possible to perform a variable speed drive even at a higher output in a wide range from a low-speed to a high-speed rotation.

As described above, in the permanent magnet type reluctance type electric motor according to this embodiment, the rotor 10 is formed to satisfy a relationship of $95 \leq W_{dave}P/2\pi R \leq 160$, more preferably, a relationship of $110 \leq W_{dave}P/2\pi R \leq 130$ where $W_{dave}$ [m] indicates an average distance between a cavity arranged in the q-axis direction and a permanent magnet, P indicates the number of poles and R [m] indicates the radius of the rotor. With this structure, it becomes possible with a small size to perform a variable speed drive even at a higher output in a wide range from a low speed to a high-speedrotation.

(Fourth Embodiment)

Figure 10:
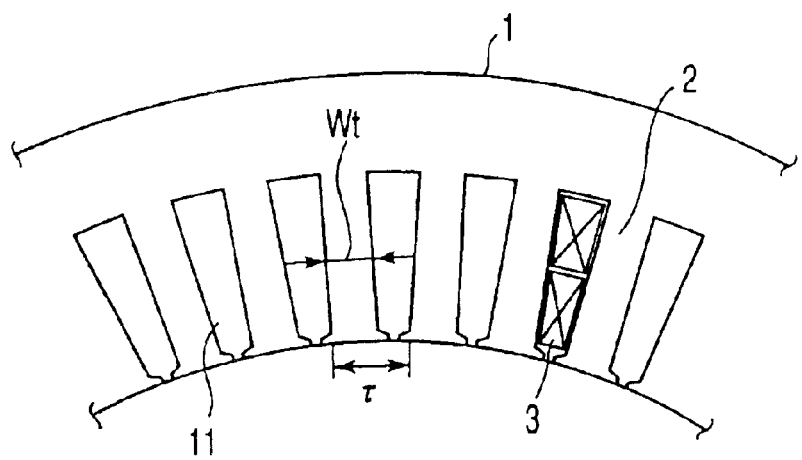
FIG. 10 is an enlarged cross sectional diagram showing an example of the structure of the permanent magnet type reluctance electric motor according to the second and fourth embodiments of the present invention.

FIG. 10 is a cross sectional diagram showing an enlarged view of a part of a stator 1 in the permanent magnet type reluctance electric motor according to the embodiment of the present invention, and in this figure, similar structural elements to those shown in FIGS. 2 and 3 are designated by the same reference numerals, the description of which will not be repeated here. Thus, only different sections from those already described will now be explained.

As shown in FIG. 10, the stator 1 of the permanent magnet type reluctance electric motor according to this embodiment, is formed to satisfy a relationship of: $0.45 \leq W_t/\tau \leq 0.8$, where z [m] indicates the pitch of the slot and $W_t$ [m] indicates the width of the teeth (stator iron core teeth width).

Next, in the permanent magnet type reluctance electric motor having the above-described embodiment according to the embodiment of the present invention, the stator 1 satisfies a relationship of: $0.45 \leq W_t/\tau \leq 0.8$. With this structure, a high torque can be obtained.

This point will now be described in detail.

The pitch of the slot is expressed as $\tau$ [m] and the width of the teeth is expressed as $W_t$ [m], and the current density is adjusted in order to suppress the heat generation to a predetermined value or less.

In general permanent magnet motors and induction motors, as many as possible conductors are inserted into a slot in order to increase the ampere-turns, thus obtaining a high torque and high output. As a result, the slot width is set larger than the teeth width.

When the teeth width is widened, the current density flowing in the slot is increased, and the absolute value of the conduction current flowing in the slot is decreased at a certain level. Therefore, the torque is decreased.

On the other hand, the permanent magnet reluctance motor according to this embodiment exhibits the opposite results as follows.

That is, the teeth width $W_t$ becomes narrow, the magnetic saturation occurs at a teeth site, thus increasing the magnetic reluctance of the teeth. Therefore, the magnetic reluctance with regard to the current becomes to have a high magnetic reluctance ratio occupying the stator 1, and the difference in the magnetic reluctance within the stator 1 becomes small with relative to each other. As a result, the reluctance torque becomes small, and the output is decreased.

On the other hand, when the teeth width $W_t$ becomes wide, the ampere-turns decrease; however the difference in the magnetic reluctance becomes larger. As a result, the torque is increased. Further, the absolute value of the inductance is decreased due to a decrease in the ampere-turns, an output at a high-speed region is increased in the power source.

Figure 11:
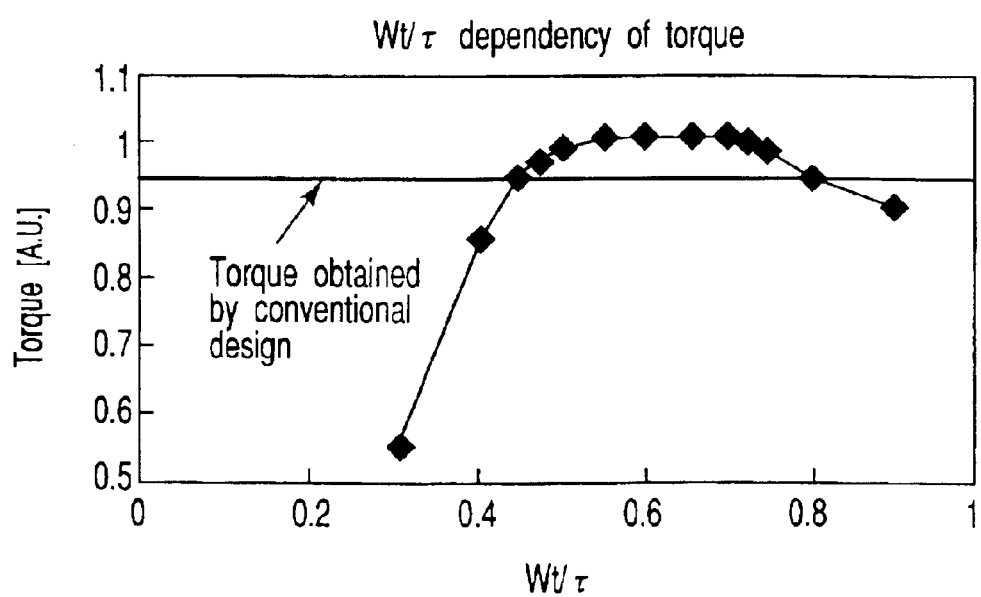
FIG. 11 is a characteristic diagram illustrating the $W_t/\tau$ dependency of the torque in the permanent magnet type reluctance electric motor according to the second embodiment of the present invention.

FIG. 11 is a dependency characteristic diagram showing the result of the test for the relationship between $W_t/\tau$ and the torque.

From FIG. 11, it is understood that in a range of $0.45 \leq W_t/\tau \leq 0.8$, a high torque can be obtained.

Thus, a high torque can be obtained and as a result of that, it becomes possible to perform a variable speed drive at a high output (output=torque×rotation speed) in a wide range from a low-speed to a high-speed rotation.

As described above, in the permanent magnet type reluctance electric motor according to the embodiment of the present invention, the stator 1 of the permanent magnet type reluctance electric motor according to this embodiment, is formed to satisfy a relationship of: $0.45 \leq W_t/\tau \leq 0.8$, where $\tau$ [m] indicates the pitch of the slot and $W_t$ [m] indicates the width of the teeth (stator iron core teeth width). Thus, it becomes possible with a small size to perform a variable speed drive at a high output in a wide range from a low-speed to a high-speed rotation.

(Other Embodiments)

It should be noted that the present invention is not limited to each of the above-described embodiments, but it can be remodeled into various versions as long as the essence of the invention does not fall out of the scope of the invention in its practical use.

Further, when practicing the present invention, the embodiments thereof may be combined as appropriately as possible. In such cases, the operational effects of the respective embodiments are combined together.

For example, in the first to the third embodiments which practice the inventions regarding the structure of the rotor, arbitrary ones or all of the embodiments can be combined appropriately when practically used.

Further, any one of or any combination of the first to the third embodiments which practice the inventions regarding the structure of the rotor, and the fourth embodiment which practices the invention regarding the structure of the stator can be combined together appropriately when practicing the invention.

Furthermore, the above-described embodiments include inventions of various stages and levels, and therefore when a plurality of structural elements disclosed here are combined appropriately, various inventions can be extracted.

For example, even if some of the structural elements are removed from the all elements discussed in the embodiments, (at least one of) the objects described in the section of the Object to be Solved by the Invention, can be achieved, and if (at least one of) the effects stated in the section of the Effects of the Invention can be obtained, such a structure that the structural elements have been removed, can be extracted as the invention.

What is claimed is:

1. A permanent magnet type reluctance electric motor comprising:
    a stator including a stator iron core and having armature coils placed inside slots; and
    a rotor provided with a plurality of magnetic barriers formed by cavities and placed on an inner side of the stator in such a manner that sections where a magnetic flux can easily pass (d-axis) and sections where a magnetic flux cannot easily pass (q-axis) are alternately formed, and made of a rotor iron core having permanent magnets in cavities,
    wherein the rotor satisfies a relationship of:

$PL/2\pi RW_{qave} \geq 130$, where $W_{qave}$ [m] indicates an average thickness of the rotor iron core on an outer side in a radial direction of the rotor with respect to cavities arranged in a q-axis direction, L [m] indicates a width in a circumferential direction of the cavities, P indicates the number of poles and R (m) indicates the radius of the rotor.

2. A permanent magnet type reluctance electric motor according to claim 1, wherein the rotor satisfies a relationship of $PL/2\pi RW_{qave} \geq 200$.

3. A permanent magnet type reluctance electric motor according to claim 1, wherein the cavities arranged in the q-axis direction extend through to an outer circumferential portion in a radial direction of the rotor.

4. A permanent magnet type reluctance electric motor comprising:
    a stator including a stator iron core and having armature coils placed inside slots; and
    a rotor provided with a plurality of magnetic barriers formed by cavities and placed on an inner side of the stator in such a manner that sections where a magnetic flux can easily pass (d-axis) and sections where a magnetic flux cannot easily pass (q-axis) are alternately formed, and made of a rotor iron core having permanent magnets in cavities,
    wherein the rotor satisfies a relationship of:

$W_{dmin}P/2\pi R \geq 65$, where $W_{dmin}$ (m) indicates a minimum distance between a cavity arranged in the q-axis direction and a permanent magnet, P indicates the number of poles and R (m) indicates the radius of the rotor.

5. A permanent magnet type reluctance electric motor according to claim 4, wherein the rotor is formed to have a structure which satisfies a relationship of:

$W_{dmin}P/2\pi R \geq 87$.

6. A permanent magnet type reluctance electric motor comprising:
    a stator including a stator iron core and having armature coils placed inside slots; and
    a rotor provided with a plurality of magnetic barriers formed by cavities and placed on an inner side of the stator in such a manner that sections where a magnetic flux can easily pass (d-axis) and sections where a magnetic flux cannot easily pass (q-axis) are alternately formed, and made of a rotor iron core having permanent magnets in cavities,
    wherein the rotor satisfies a relationship of:

$110 \leq W_{dave}P/2\pi R \leq 150$, where $W_{dave}$ (m) indicates an average distance between a cavity arranged in the q-axis direction and a permanent magnet, P indicates the number of poles and R (m) indicates the radius of the rotor.

7. A permanent magnet type reluctance electric motor according to claim 6, wherein the rotor satisfies a relationship of: $110 \leq W_{dave}P/2\pi R \leq 130$.

8. A permanent magnet type reluctance electric motor according to claim 1, wherein the width in the radial direction of a cavity situated in the q-axis direction is increased towards the center in the q-axis direction.

9. A permanent magnet type reluctance electric motor according to claim 1, wherein the angle of the permanent magnets is changed so that the distance between a cavity situated in the q-axis direction and a permanent magnet becomes maximum at a position on an inner diameter side of the center of the cavity in the q-axis direction.

10. A permanent magnet type reluctance electric motor comprising:
    a stator including a stator iron core and having armature coils placed inside slots; and
    a rotor provided with a plurality of magnetic barriers formed by cavities and placed on an inner side of the stator in such a manner that sections where a magnetic flux can easily pass (d-axis) and sections where a magnetic flux cannot easily pass (q-axis) are alternately formed, and made of a rotor iron core having permanent magnets in cavities,
    wherein the stator satisfies a relationship of:

$0.45 \leq W_t/\tau \leq 0.8$, where $\tau$(m) indicates the pitch of the slot and $W_t$ (m) indicates the width of the teeth.

11. A permanent magnet type reluctance electric motor according to claim 1, wherein the stator is formed to have a structure which satisfies a relationship of: $0.45 \leq W_t/\tau \leq 0.8$.

* * * * *